(12) United States Patent
Hata et al.

(10) Patent No.: US 6,301,092 B1
(45) Date of Patent: Oct. 9, 2001

(54) CERAMIC CAPACITOR AND METHOD FOR MAKING THE SAME

(75) Inventors: Kotaro Hata, Kyoto; Toshihiro Okamatsu, Moriyama; Tomoyuki Nakamura; Kenji Hori, both of Shiga-Ken; Harunobu Sano, Kyoto, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/591,298

(22) Filed: Jun. 9, 2000

(30) Foreign Application Priority Data

Jun. 17, 1999 (JP) .................................................. 11-170961

(51) Int. Cl.$^7$ ...................................................... H01G 4/06
(52) U.S. Cl. .................................. 361/321.2; 361/321.2; 361/306.3; 361/321.4; 361/321.5
(58) Field of Search .............................. 361/321.4, 321.5, 361/306.3, 313, 309, 321.2; 501/134, 135, 136

(56) References Cited

U.S. PATENT DOCUMENTS

| | | | |
|---|---|---|---|
| 4,978,646 | * 12/1990 | Bardhan et al. | 501/134 |
| 5,565,391 | * 10/1996 | Nakano et al. | 501/135 |
| 5,734,545 | * 3/1998 | Sano et al. | 361/321.4 |
| 5,818,686 | * 10/1998 | Mizuno et al. | 361/311 |
| 5,852,542 | * 12/1998 | Wada et al. | 361/321.5 |
| 5,995,360 | * 11/1999 | Hata et al. | 361/321.5 |

FOREIGN PATENT DOCUMENTS

07744448A1  5/1997 (EP) .

* cited by examiner

Primary Examiner—Dean A. Reichard
Assistant Examiner—Nguyen Ha
(74) Attorney, Agent, or Firm—Ostrolenk, Faber, Gerb & Soffen, LLP

(57) ABSTRACT

A ceramic capacitor has a dielectric ceramic layer and at least one pair of electrodes. The dielectric ceramic layer has a primary phase and secondary phases, and the size of the secondary phases in the thickness direction of the dielectric ceramic layer is not more than about one-third of the thickness of the dielectric ceramic layer. A method for making the ceramic capacitor includes the steps of mixing compounds constituting secondary phases in a primary phase of a dielectric ceramic, annealing and then pulverizing the mixture to prepare a raw material for the secondary phases, mixing the raw material for the secondary phases with other materials for the dielectric ceramic shaping and sintering the mixture to form a dielectric ceramic, and forming electrodes on the dielectric ceramic. The ceramic capacitor has high insulation resistance, superior load characteristics at high temperatures or high humidity and high weather resistance, even when sintered in a reducing atmosphere.

17 Claims, 2 Drawing Sheets

(1 of 2 Drawing Sheet(s) Filed in Color)

bar=10 μm bar=10 μm

CERAMIC CAPACITOR AND METHOD FOR MAKING THE SAME

BACKGROUND OF THE INVENTION

1. Field of the Invention

The present invention relates to ceramic capacitors, particularly to monolithic ceramic capacitors having thin dielectric ceramic layers, and relates to methods for making the same.

2. Description of the Related Art

Ceramic capacitors, particularly monolithic ceramic capacitors, are typically produced as follows. Dielectric sheets, each primarily composed of, for example, $BaTiO_3$, are prepared. An electrode material for an internal electrode is applied to a surface of each dielectric sheet. The dielectric sheets provided with electrode materials are laminated, are thermally compressed, and are sintered at 1,250 to 1,350° C. in an ambient atmosphere to form a dielectric ceramic having the internal electrodes. External electrodes connecting to the internal electrodes are provided by baking on both sides of the dielectric ceramic to form a monolithic ceramic capacitor.

Thus, the internal electrode material must satisfy the following conditions.

(A) Since the dielectric sheets and the internal electrode material are simultaneously sintered, the internal electrode material must have a melting point which is higher than the temperature at which the dielectric sheet material is sintered.

(B) The internal electrode material must not be oxidized and must not react with the dielectric sheet material in an oxidative high-temperature atmosphere.

As internal electrode materials satisfying such conditions, noble metals, such as platinum, gold, palladium and silver-palladium alloys, have been used since these noble metals exhibit superior properties when used as internal electrodes. These noble metals, however, are expensive, and this is a major factor increasing production costs of monolithic ceramic capacitors.

Other than noble metals, base metals having high melting points are, for example, Ni, Fe, Co, W, and Mo. These base metals, however, are readily oxidized in high-temperature oxidizing atmospheres and thus are not suitable for electrodes. When these base metals are used as internal electrodes of monolithic ceramic capacitors, the composite must be sintered in neutral or reducing atmospheres. Conventional dielectric ceramic materials, however, are significantly reduced during sintering in such neutral or reducing atmospheres and are thus converted to semiconductor materials.

In order to solve this problem, Japanese Examined Patent Application Publication No. 57-42588 discloses a dielectric material composed of a barium titanate solid solution in which the ratio of the barium site to the titanium site is stoichiometrically excessive. In addition, Japanese Unexamined Patent Application Publication No. 61-101459 discloses a dielectric material composed of a barium titanate solid solution containing an oxide of a rare earth element, such as La, Nd, Sm, Dy or Y.

Known dielectric materials exhibiting a small change in dielectric constant with temperature include, for example, a $BaTiO_3$—$CaZrO_3$—$MnO$—$MgO$ based composition disclosed in Japanese Unexamined Patent Application Publication No. 62-25422, and a $BaTiO_3$—$(Mg,Zn,Sr,Ca)O$—$B_2O_3$—$SiO_2$ based composition disclosed in Japanese Examined Patent Application Publication No. 61-14611.

Since these dielectric materials are not converted into semiconductor materials during sintering in reducing atmospheres, base metals such as nickel can be used as internal electrodes in the production of monolithic ceramic capacitors.

In recent years, miniaturization of electronic components is making rapid progress as electronic technologies develop, and further miniaturization and larger capacitances are required in monolithic ceramic capacitors. Thus, development of higher dielectric constant dielectric materials and reduced thickness dielectric ceramic layers is rapidly progressing. Current dielectric materials are, therefore, required to have high dielectric constants, small changes in dielectric constant with temperature and high reliability.

Although the dielectric materials disclosed in Japanese Examined Patent Application Publication No. 57-42588 and Japanese Unexamined Patent Application Publication No. 61-101459 have large dielectric constants, segregation of rare earth elements readily occurs in dielectric ceramic matrices. Such segregation of rare earth elements causes significantly reduced reliability of thin dielectric ceramic layers having a thickness of 10 $\mu$m or less.

The dielectric material disclosed in Japanese Unexamined Patent Application Publication No. 62-256422 has a relatively large dielectric constant and changes in dielectric constant with temperature are small. In this material, however, $CaZrO_3$, and $CaTiO_3$ are formed during sintering and readily form secondary phases together with Mn. Thus, this dielectric material exhibits less reliability at high temperatures.

When secondary phases are formed by segregation of one or more elements in the primary phase of a dielectric ceramic layer, reliability is significantly reduced in a monolithic ceramic capacitor comprising such dielectric ceramic layers having a thickness of 10 $\mu$m or less. When the secondary phases exhibit low resistance to reduction, sintering in a reducing atmosphere causes further decrease in the reliability of the monolithic ceramic capacitor.

SUMMARY OF THE INVENTION

Accordingly, it is an object of the present invention to provide a ceramic capacitor having high insulation resistance, superior load characteristics at high temperatures or high humidity, and high weather resistance, even when sintered in a reducing atmosphere.

It is another object of the present invention to provide a monolithic ceramic capacitor having large capacitance.

It is still another object of the present invention to provide a method for making the ceramic capacitor.

A ceramic capacitor of the present invention comprises a dielectric ceramic layer and at least one pair of electrodes, one member of the pair provided on each side of the dielectric, wherein the dielectric ceramic layer comprises a primary phase and secondary phases, and the size of the secondary phases in the thickness direction of the dielectric ceramic layer is not more than about one-third of the thickness of the entire dielectric ceramic layer.

Preferably, the dielectric ceramic layer comprises a non-reduced dielectric ceramic which is formed by sintering in a neutral or reducing atmosphere and which comprises a primary component represented by the formula $ABO_3$, wherein A is at least one selected from Ba, Sr, Ca and Mg, and B is at least one selected from Ti, Zr and Hf; at least one rare earth oxide; and a glass component primarily composed of $SiO_2$ or $B_2O_3$.

Preferably, the secondary phases comprise the rare earth oxide.

A method for making a ceramic capacitor of the present invention comprises the steps of mixing compounds constituting secondary phases in a primary phase of a dielectric ceramic, annealing and then pulverizing the mixture to prepare a raw material for the secondary phases, mixing the raw material for the secondary phases with other materials for the dielectric ceramic which are not completely or sufficiently contained in the raw material for the secondary phases, shaping and sintering the mixture to form a dielectric ceramic, and forming electrodes on the dielectric ceramic.

Preferably, the ceramic capacitor is a monolithic ceramic capacitor comprising a plurality of dielectric ceramic layers, internal electrodes provided between the dielectric ceramic layers, and external electrodes electrically connected to the internal electrodes.

The secondary phases in the present invention indicate portions at which sub-components such as the rare earth oxide and glass are segregated and are present in high concentrations compared to the primary phase, and at least one sub-component is present in a concentration which is at least about ten times the concentration in the primary phase.

Since the secondary phases in the dielectric ceramic layer of the ceramic capacitor of the present invention are composed of fine particles, an electric field is not concentrated in the secondary phases, and thus insulation resistance does not decrease. Moreover, the secondary phases exhibit high resistance to reduction.

Thus, the resulting ceramic capacitor has high insulation resistance, superior service life characteristics, such as high-temperature load and high-humid load, and high weather resistance. In particular, a monolithic ceramic capacitor having large capacitance is obtainable.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF THE PREFERRED EMBODIMENTS

Figure 1:
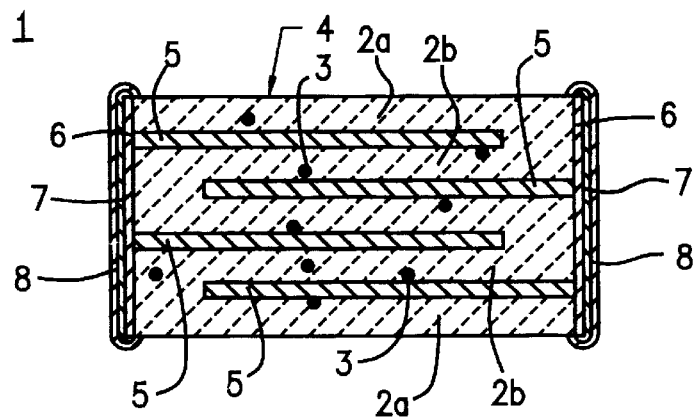
FIG. 1 is a cross-sectional view of a monolithic ceramic capacitor in accordance with the present invention.
Figure 2:
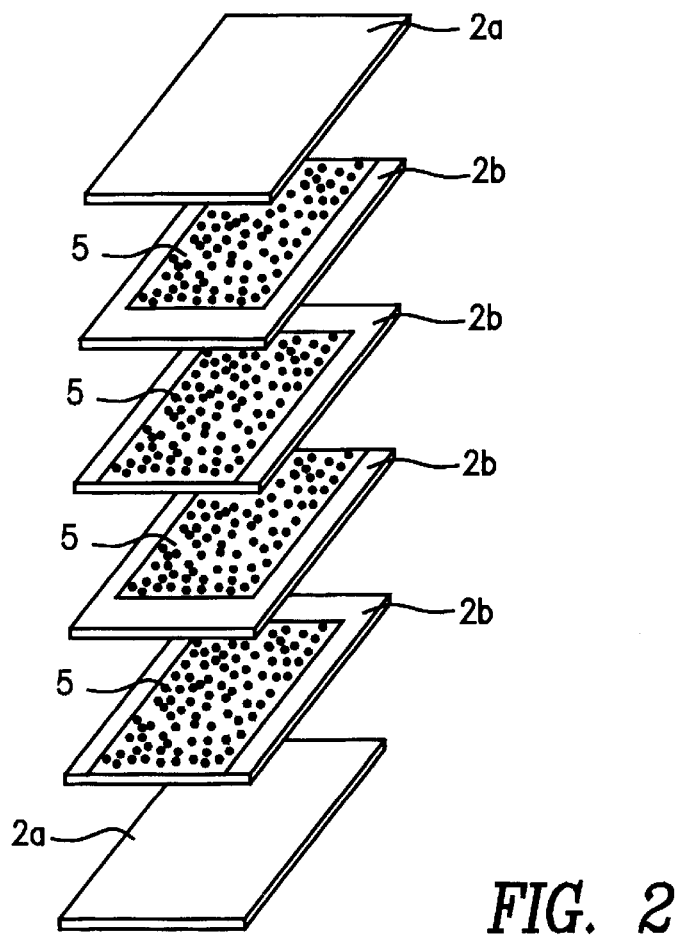
FIG. 2 is an exploded perspective view of ceramic layers of the monolithic ceramic capacitor shown in FIG. 1.

A basic structure of a monolithic ceramic capacitor as an embodiment of the present invention is described with reference to FIGS. 1 and 2. FIG. 1 is a cross-sectional view of the monolithic ceramic capacitor, and FIG. 2 is an exploded perspective view of ceramic layers of the monolithic ceramic capacitor in FIG. 1.

With reference to FIG. 1, the monolithic ceramic capacitor 1 in this embodiment includes a prismatic ceramic composite 4 formed of a plurality of dielectric ceramic layers 2a and 2b and internal electrodes 5 provided therebetween. The prismatic ceramic composite 4 is provided with external electrodes 6 on both sides thereof. The external electrodes 6 are electrically connected to the internal electrodes 5. Each external electrode 6 is covered with a first plating layer 7 composed of nickel or copper and a second plating layer 8 composed of solder or tin.

Each dielectric ceramic layer 2b of the monolithic ceramic capacitor 1 is composed of a primary phase and secondary phases 3. The size of the secondary phases 3 is not more than about one-third of the thickness of the dielectric ceramic layer 2b in the thickness direction of the dielectric ceramic layer 2b to avoid decreased reliability due to concentration of an applied electric field into the secondary phases 3 and deterioration of insulation resistance. In a high-capacitance monolithic ceramic capacitor formed by laminating at least 100 dielectric ceramic layers, each having a thickness of 10 $\mu$m or less, higher reliability is required. Thus, the size of the secondary phases 3 is preferably not more than about a quarter of the thickness of the dielectric ceramic layer.

The dielectric ceramic layer preferably comprises a non-reduced dielectric ceramic comprising a primary component represented by the formula $ABO_3$, wherein A is at least one selected from Ba, Sr, Ca and Mg, and B is at least one selected from Ti, Zr and Hf; at least one rare earth oxide; and a glass component primarily composed of $SiO_2$ or $B_2O_3$. This dielectric ceramic is not reduced during sintering in a neutral or reducing atmosphere, and allows the use of base metals, such as nickel and copper, as electrode materials.

Examples of rare earth oxides include oxides of Y, Sm, Eu, Gd, Tb, Dy, Ho, Er, Tm and Yb. These rare earth oxides may be used alone or in combination. The content of the rare earth oxide is preferably about 1 to 6 mole percent. Preferably, the dielectric ceramic of the present invention further comprises at least one metal oxide other than the rare earth oxide to enhance nonreducing characteristics. Examples of metal oxides include oxides of Mg, Mn, Ni, Al, Co, Zn and Nb.

The glass component primarily composed of $SiO_2$ or $B_2O_3$ allows sintering at low temperatures. Thus, the formation and precipitation of the secondary phases are suppressed, resulting in high reliability of the monolithic ceramic capacitor. The glass component may be composed of a $SiO_2$—$B_2O_3$ glass, a $SiO_2$—$Li_2O$ glass, a $SiO_2$—BaO—MgO glass, and a $SiO_2$—CaO glass. The glass component material may be fine particulate $SiO_2$ or silica sol.

A method for making the monolithic ceramic capacitor 1 will now be described.

A powdered mixture of a primary raw material, a secondary-phase material, and other sub-components is prepared for the dielectric ceramic layers 2a and 2b. The composition of the secondary-phase material is determined based on the analytical results of the composition of the secondary phases which is formed when a target dielectric ceramic is obtained. That is, compounds of elements constituting the secondary phases are mixed, and the mixture is heated to a temperature which is the same as the temperature forming the secondary phases, and is pulverized to form fine particles of the secondary-phase material having a particle size which is smaller than that of the primary raw material. The secondary-phase material does not substantially react with other components during sintering, and the formed secondary phases in the dielectric ceramic are stable and fine. As a result, the ceramic capacitor is highly reliable.

An organic binder is added to the powdered raw material to form a slurry. Green sheets for the dielectric ceramic layers 2a and 2b are formed from the slurry.

An internal electrode 5, composed of nickel or a nickel alloy, is formed on one main face of each green sheet for the dielectric ceramic layer 2b, by screen printing, vapor deposition or plating.

A required number of green sheets having the internal electrodes 5 for the dielectric ceramic layers 2b are laminated. With reference to FIG. 2, the laminate is sandwiched by green sheets not having internal electrodes for the dielectric ceramic layers 2a, and these are compressed to form a green compact.

The green compact is sintered in a reducing atmosphere at a predetermined temperature to form the prismatic ceramic composite 4.

External electrodes 6 are formed on both sides of the prismatic ceramic composite 4 and are connected to the internal electrodes 5. The external electrodes 6 may be composed of the same materials used for the internal electrodes 5. Alternatively, the external electrodes 6 may be composed of silver, palladium, a silver-palladium alloy, copper or a copper alloy. Alternatively, the external electrode material may be a mixture of powders of the above metals and frit of glass, such as $B_2O_3$—$SiO_2$—$BaO$ glass, or $Li_2O$—$SiO_2$—$BaO$ glass. A preferred material is selected in view of the purpose and the environment in which the monolithic ceramic capacitor is used. The external electrodes 6 are formed by applying and baking a powdered metal paste onto the sintered prismatic ceramic composite 4. The external electrodes 6 may be formed by applying the paste onto a green ceramic composite 4 and then sintering the paste and the green ceramic composite 4.

Each external electrode 6 is covered with a first plating layer 7 of copper or the like. The first plating layer 7 is covered with a second plating layer 8 composed of solder or tin to complete the monolithic ceramic capacitor 1. The first and second plating layers may be omitted in monolithic ceramic capacitors for specific uses.

EXAMPLES

Oxalic acid was added to an aqueous solution of $TiCl_4$ and $Ba(NO_3)_2$, each having a purity of at least 99%, to precipitate barium titanyloxalate ($BaTiO(C_2O_4)_2 \cdot 4H_2O$). The precipitate was pyrolyzed at a temperature of at least 1,000° C. to form barium titanate ($BaTiO_3$—BT in the Tables) having a Ba/Ti ratio of 0.998 and an average diameter of 0.4 µm as a primary raw material. $Ba_{0.99}Ca_{0.01}Ti_{0.98}Zr_{0.02}O_3$ (BTCZ in the Tables) as another primary raw material having a (Ba+Ca)/(Ti+Zr) ratio of 0.999 and an average diameter of 0.4 µm was prepared using an aqueous solution of $TiCl_4$, $ZrOCl_2$, $Ba(NO_3)_2$ and $Ca(NO_3)_2$, by the same method.

$Y_2O_3$, $BaCO_3$, $CaCO_3$, $SiO_2$, MgO, $MnCO_3$, NiO and $Co_2O_3$ were prepared as sub-component raw materials. Dielectric ceramics were prepared as follows using the synthesized $BaTiO_3$ or $Ba_{0.99}Ca_{0.01}Ti_{0.98}Zr_{0.02}O_3$ as a primary component and the sub-component raw materials.

A mixture containing $BaTiO_3$ or $Ba_{0.99}Ca_{0.01}Ti_{0.98}Zr_{0.02}O_3$ as the primary component and predetermined amounts of sub-component raw materials was molded and sintered to form a dielectric ceramic. Secondary phases formed in the dielectric ceramic were observed by fluorescent X-ray microanalysis. The secondary phases contained Y, Ba, Ca and Si in a molar ratio of Y:Ba:Ca:Si=approximately 2:1:2:1. $Y_2O_3$, $BaCO_3$, $CaCO_3$ and $SiO_2$ were weighed so that the molar ratio Y:Ba:Ca:Si was 2:1:2: 1. were mixed, and were heated to a temperature at which the secondary phases were formed. The product was pulverized so that the particle size was less than the average particle size of powdered $BaTiO_3$ to prepare a raw material for the secondary phases.

The primary raw material ($BaTiO_3$ or $Ba_{0.99}Ca_{0.01}Ti_{0.98}Zr_{0.02}O_3$), the secondary-phase material, sub-components ($Y_2O_3$, $BaCO_3$, MgO, $MnCO_3$, NiO and $Co_2O_3$), and a $B_2O_3$—$SiO_2$—$BaO$ glass component were weighed so that compositions shown in Table 1 were obtained. In Table 2. the contents of the secondary-phase material and the sub-components are represented in parts by mole with respect to 100 parts by mole of the primary raw material, and the content of the glass component is represented in parts by weight with respect to 100 parts by weight of the primary raw material. As shown in Table 1. Sample 1 and Sample 6 have the same composition in terms of the secondary-phase material, the sub-components and the glass component.

A polyvinyl butyral binder and an organic solvent such as ethanol were added to the mixture, and the mixture was wet-mixed using a ball mill to prepare a ceramic slurry. Ceramic green sheets were prepared from the ceramic slurry by the doctor blade process.

A Ni-based conductive paste was printed onto each ceramic green sheet to form a conductive paste layer as an internal electrode. A plurality of ceramic green sheets was laminated so that exposed sites of the conductive paste layers were alternately positioned at both sides. The laminate was heated to 270° C. to burn off the binder, and was then sintered for 2 hours in a reducing atmosphere composed of $H_2$—$N_2$—$H_2O$ gas at one of temperatures shown in Table 2 to prepare a monolithic ceramic sintered compact.

A silver paste containing $B_2O_3$—$Li_2O$—$SiO_2$—$BaO$ glass frit was applied onto both side faces of the sintered compact and was fired at 800° C. to form external electrodes which were electrically connected to the internal electrodes.

The resulting monolithic ceramic capacitor had a width of 1.6 mm, a length of 3.2 mm and a thickness of 1.2 mm. The thickness of the dielectric ceramic layers between the internal electrodes was 4 µm. The number of the effective dielectric ceramic layers was 50 and the area of the opposing electrode per layer was 2.1 mm².

The electrical characteristics of the resulting monolithic ceramic capacitor were measured. The electrostatic capacitance (C) and the dielectric loss (tan) were measured using an automatic bridge tester at a frequency of 1 kHz, 1 Vrms and at a temperature of 25° C., and the specific dielectric constant ($\epsilon$) was calculated from the electrostatic capacitance. A direct current of 16 volts was applied to the monolithic ceramic capacitor for 2 minutes and the insulation resistance (R) was measured at 25° C. using an insulating resistance meter, and the product CR of the electrostatic capacitance (C) and the insulation resistance (R) was calculated.

As a high-temperature load life test, a direct current of 40 volts was applied to 36 monolithic ceramic capacitors for each sample at 150° C. to measure changes in insulation resistance over time. In the high-temperature load life test, the service life was defined as the time when the insulation resistance (R) of each capacitor became $10^6$ Ω or less, and the average service life was calculated for 36 capacitors. In a high-humidity load test, a direct current of 16 volts was applied to 72 monolithic ceramic capacitors for each sample at a pressure of 2 atmospheres (relative humidity 100%) and at 121° C. A capacitor having an insulation resistance (R) of $10^6$ Ω or less before 250 hours was defined as being a defective unit. The number of defective units was then determined.

The rate of change in electrostatic capacitance with temperature ($\Delta C/C_{25}°$ C.) with respect to the electrostatic capacitance at 25° C. was measured at −55° C. and 125° C.

The size of the secondary phases formed in the dielectric ceramic was determined as follows. The monolithic ceramic capacitor was polished perpendicular to the internal electrode surface to expose the dielectric ceramic layer. The polished cross-section was observed by a scanning electron microscope (SEM) and a wavelength dispersive electron probe microanalyzer (EPMA). The size of the secondary phases was determined by the equation:

Relative size of secondary phases=(size of the secondary phases in the thickness direction of the dielectric ceramic layer)/(thickness of the dielectric ceramic layer)

The results are shown in Table 2.

As shown in Table 2, the monolithic ceramic capacitors according to Examples of the present invention have prolonged average service lives and they do not fail during the high-humidity load test. Thus, the monolithic ceramic capacitors are highly reliable. The specific dielectric constant ($\epsilon$) exceeds 3,500 and the rate of change in capacitance with temperature satisfies these X7R characteristics defined in the Electronic Industries Association (EIA) standard within a range between −55° C. and 125° C.

Figure 3:
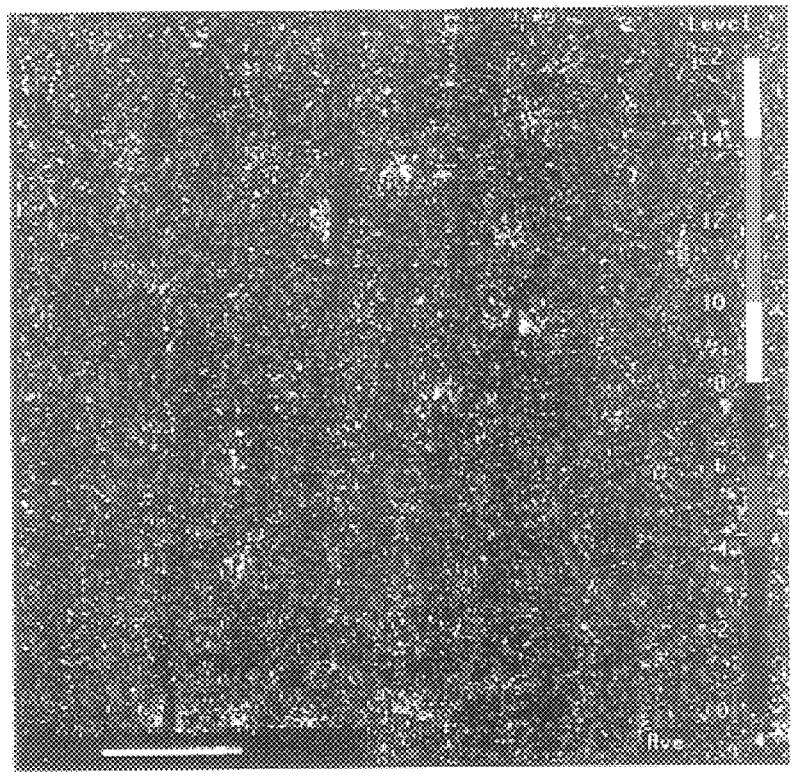
FIG. 3 is an electron probe microanalyzer (EPMA) photograph showing a distribution of yttrium of a ceramic of Sample No. 1 among Examples in accordance with the present invention.

FIG. 3 is a photograph of a distribution of yttrium (Y) as a sub-component observed by the EPMA in sample No. 1. Two or three secondary phases of approximately 0.5 μm, which is the detection limit, are present in an analytical field of 50×50 μm, as shown by white clusters in FIG. 3. These secondary phases are primarily composed of Y, Ca, Si, Ba and O. In Sample No. 1. the size of the secondary phases present in the dielectric ceramic layer in the thickness direction is approximately one-eighth the thickness of the dielectric ceramic layer. Such fine secondary phases contribute to high reliability of the resulting capacitor.

Comparative Examples

Monolithic ceramic capacitors were prepared and subjected to evaluation with respect to electrical characteristics as in the Examples, but all the sub-component raw materials and $BaTiO_3$ or $Ba_{0.99}Ca_{0.01}Ti_{0.98}Zr_{0.02}O_3$ as a primary component were simultaneously mixed, instead of preliminary preparation and addition of the secondary-phase material. The results are shown in Table 3.

Table 3 shows that monolithic ceramic capacitors of Comparative Examples have shorter service lives and fail during the high-humidity load test. Thus, the monolithic ceramic capacitors of Comparative Examples are less reliable.

Figure 4:
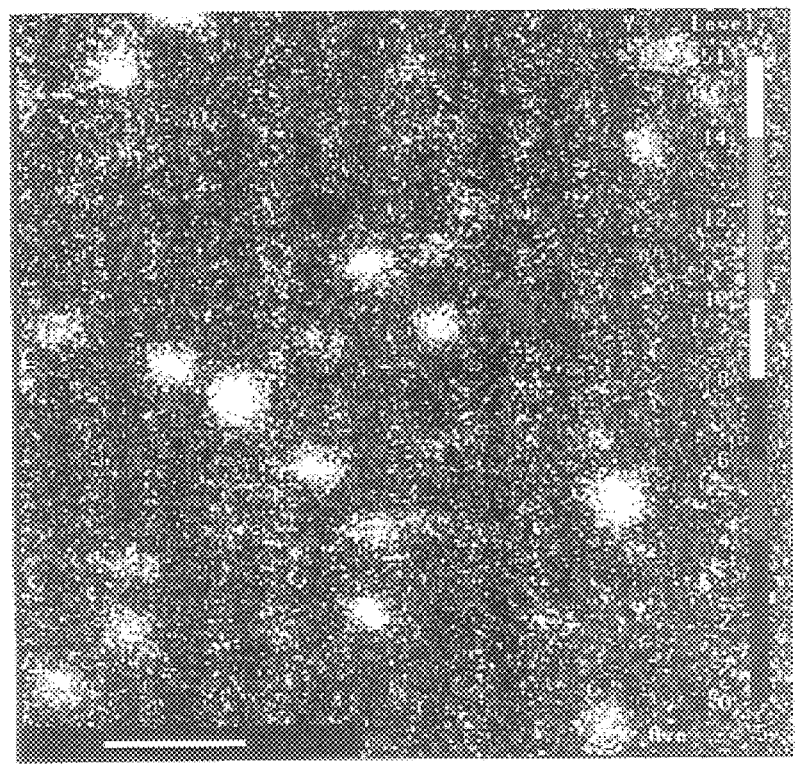
FIG. 4 is an EPMA photograph showing a distribution of yttrium of a ceramic of Sample No. 9 among Comparative Examples.

FIG. 4 is a photograph of a distribution of yttrium (Y) as a sub-component observed by the EPMA in Sample No. 9. Secondary phases of approximately 2 to 3 μm are formed, as shown by white clusters in FIG. 4. These secondary phases are primarily composed of Y, Ca, Si, Ba and O. as in the Examples. Moreover, some secondary phases primarily composed of Y and O are confirmed. These coarse secondary phases are formed by crystal growth of reaction products of the rare earth element with other sub-components or the glass component or by crystal growth of the rare earth element.

In Sample No. 9, the size of the secondary phases present in the dielectric ceramic layer in the thickness direction is approximately 45% of the thickness of the dielectric ceramic layer. Such coarse secondary phases cause lower reliability in the resulting capacitor.

In addition to the formation of coarse secondary phases, the sub-components are also dissolved into $BaTiO_3$. Thus, the monolithic ceramic capacitors of Comparative Examples have lower $\epsilon$ values and larger rates of change in capacitance with temperature compared to the monolithic ceramic capacitors of the Examples.

According to the above Examples and Comparative Examples, the monolithic ceramic capacitor of the present invention does not include coarse secondary phases, has an average service life of at least 200 hours, does not fail during a high-humidity load test, has a specific dielectric constant ($\epsilon$) of at least 3,500, and exhibits a rate of change in electrostatic capacitance with temperature which satisfies the X7R characteristics according to the EIA standard.

The present invention is also applicable to ceramic capacitors of various shapes and types, in addition to the monolithic ceramic capacitors described in the above embodiments.

TABLE 1

| | | | Secondary-Phase Composition | | Average Other Sub-Component Parts by Mole | | | | | | $B_2O_3$—$SiO_2$—BaO |
| --- | --- | --- | --- | --- | --- | --- | --- | --- | --- | --- | --- |
| Sample No. | Primary Component | Identifier | Composition Parts by Mole | Particle Size (μm) | $Y_2O_3$ | $BaCO_3$ | MgO | NiO | $MnCO_3$ | $Co_2O_3$ | Glass Component Parts by Weight |
| 1 | BT | A | 3.0 | 0.30 | 0.5 | 0.1 | 0.5 | 0.4 | 0.1 | 0.1 | 0.9 |
| 2 | BT | B | 1.5 | 0.35 | 0.7 | 0.2 | 0.2 | 0.6 | 0.2 | 0.0 | 0.6 |
| 3 | BT | C | 4.2 | 0.30 | 0.3 | 0.0 | 0.7 | 0.2 | 0.2 | 0.1 | 0.8 |
| 4 | BT | D | 2.4 | 0.35 | 0.5 | 0.3 | 0.1 | 0.5 | 0.1 | 0.1 | 0.5 |
| 5 | BT | E | 3.0 | 0.40 | 0.3 | 0.1 | 0.6 | 0.1 | 0.3 | 0.2 | 0.8 |
| 6 | BTCZ | A | 3.0 | 0.30 | 0.5 | 0.1 | 0.5 | 0.4 | 0.1 | 0.1 | 0.9 |

TABLE 2

| Sample No. | Sintering Temperature (° C.) | Ratio of Size of Secondary Phase | CR Product (Ω F) | Average Service Life (hr) | High-Humidity Load Test Number of Failures | Specific Dielectric Constant ε | Dielectric Loss (%) | Rate of Change in Capacitance with Temperature −55° C. | 125° C. |
|---|---|---|---|---|---|---|---|---|---|
| 1 | 1260 | 0.10 | 4330 | 3,77 | 0 | 3620 | 2.5 | −1.1 | −8.5 |
| 2 | 1240 | 0.30 | 4110 | 201 | 0 | 3580 | 2.3 | −1.0 | −7.1 |
| 3 | 1280 | 0.10 | 4520 | 310 | 0 | 4050 | 2.8 | −1.1 | −10.1 |
| 4 | 1300 | 0.20 | 4220 | 305 | 0 | 4010 | 2.7 | −1.0 | −10.1 |
| 5 | 1220 | 0.15 | 4400 | 490 | 0 | 4100 | 2.9 | −1.0 | −10.5 |
| 6 | 1250 | 0.11 | 4600 | 333 | 0 | 3550 | 2.4 | −2.0 | −10.0 |

TABLE 3

| Sample No. | Primary Component | Type of Sub-Component (Identifier) | Sintering Temperature (° C.) | Ratio of Size of Secondary Phase | CR Product (Ω F) | Average Service Life (hr) | High-Humidity Load Test Number of Failures | Specific Dielectric Constant ε | Dielectric Loss (%) | Rate of Change in Capacitance with Temperature 55° C. | 125° C. |
|---|---|---|---|---|---|---|---|---|---|---|---|
| *7 | BT | A | 1270 | 0.50 | 3960 | 28 | 9 | 3500 | 2.4 | −1.0 | −10.2 |
| *8 | BT | B | 1260 | 0.40 | 3710 | 16 | 11 | 3490 | 2.2 | −1.0 | −9.1 |
| *9 | BT | C | 1290 | 0.45 | 3990 | 19 | 25 | 3950 | 2.8 | −1.0 | −11.1 |
| *10 | BT | D | 1300 | 0.50 | 4100 | 22 | 22 | 3900 | 2.5 | −1.2 | −11.5 |
| *11 | BT | E | 1200 | 0.40 | 4010 | 40 | 12 | 3950 | 3.0 | −1.0 | −12.0 |
| *12 | BCTZ | A | 1260 | 0.52 | 4500 | 25 | 14 | 3500 | 2.4 | −2.1 | −12.9 |

What is claimed is:

1. A ceramic capacitor comprising a dielectric ceramic layer sandwiched between a pair of electrodes, wherein the dielectric ceramic layer comprises a primary phase comprising a rare earth element or Si and a secondary phase distributed therein, wherein the secondary phase comprises a material segregated from the primary phase and contains at least one material comprising a rare earth element or Si at a concentration which at least about ten times the concentration of that material in the primary phase, and wherein the secondary phase has a size measured in the thickness direction of the dielectric ceramic layer which is not more than about one-third of the thickness of the dielectric ceramic layer.

2. A ceramic capacitor according to claim 1, wherein the dielectric ceramic layer comprises a sintered nonreduced dielectric ceramic and wherein the primary component comprises an ABO3 ceramic in which A is at least one member selected from the group consisting of Ba, Sr, Ca and Mg, and B is at least one member selected from the group consisting of Ti, Zr and Hf; at least one rare earth oxide; and a glass whose major constituent is $SiO_2$ or $B_2O_3$.

3. A ceramic capacitor according to claim 2, wherein A in the formula $ABO_3$ comprises Ba and B in the formula $ABO_3$ comprises Ti, and wherein the secondary phase comprises rare earth oxide.

4. A ceramic capacitor according to claim 3 wherein the thickness of the dielectric ceramic layer is not more than about one-fourth of the thickness of the dielectric ceramic layer.

5. A ceramic capacitor according to claim 4 where the rare earth oxide comprises about 1 to 6 mole percent of the dielectric ceramic.

6. A ceramic capacitor according to claim 5 where the rare earth oxide comprises $Y_2O$.

7. A monolithic ceramic capacitor comprising a plurality of superposed ceramic capacitors according to claim 6 sandwiched between a pair of dielectric ceramic layers and a pair of external electrodes, each of which is electrically connected to a different one of said pair of electrodes sandwiching a dielectric ceramic layer.

8. A monolithic ceramic capacitor according to claim 7 containing at least 100 of said ceramic capacitors each having a thickness of 10 μm or less.

9. A ceramic capacitor according to claim 1 wherein the thickness of the dielectric ceramic layer is not more than about one-fourth of the thickness of the dielectric ceramic layer.

10. A monolithic ceramic capacitor comprising a plurality of superposed ceramic capacitors according to claim 9 sandwiched between a pair of dielectric ceramic layers and a pair of external electrodes, each of which is electrically connected to a different one of said pair of electrodes sandwiching a dielectric ceramic layer.

11. A ceramic capacitor according to claim 1 wherein the dielectric ceramic comprises about 1 to 6 mole percent of rare earth oxide.

12. A ceramic capacitor according to claim 1 wherein the dielectric ceramic further comprises a metal oxide other than said rare earth oxide.

13. A monolithic ceramic capacitor comprising a plurality of superposed ceramic capacitors according to claim 12 sandwiched between a pair of dielectric ceramic layers and a pair of external electrodes, each of which is electrically connected to a different one of said pair of electrodes sandwiching a dielectric ceramic layer.

14. A ceramic capacitor according to claim 13 where the rare earth oxide comprises $Y_2O$.

15. A ceramic capacitor according to claim 11 where the rare earth oxide comprises $Y_2O$.

16. A monolithic ceramic capacitor comprising a plurality of superposed ceramic capacitors according to claim 1 sandwiched between a pair of dielectric ceramic layers and a pair of external electrodes, each of which is electrically connected to a different one of said pair of electrodes sandwiching a dielectric ceramic layer.

17. A monolithic ceramic capacitor according to claim 16 containing at least 100 of said ceramic capacitors each having a thickness of 10 $\mu$m or less.

* * * * *